(12) United States Patent
Karlsson (10) Patent No.: US 11,286,004 B2
(45) Date of Patent: Mar. 29, 2022

(54) LATERAL PUSH ELEMENT

(71) Applicant: Volvo Car Corporation, Gothenburg (SE)

(72) Inventor: Daniel Karlsson, Ytterby (SE)

(73) Assignee: Volvo Car Corporation, Gothenburg (SE)

( * ) Notice: Subject to any disclaimer, the term of this patent is extended or adjusted under 35 U.S.C. 154(b) by 114 days.

(21) Appl. No.: 16/815,067

(22) Filed: Mar. 11, 2020

(65) Prior Publication Data

US 2020/0324818 A1 Oct. 15, 2020

(30) Foreign Application Priority Data

Apr. 11, 2019 (EP) ..................................... 19168666

(51) Int. Cl.
| | | |
|---|---|---|
| B62D 25/02 | (2006.01) | |
| B62D 21/03 | (2006.01) | |
| B62D 21/08 | (2006.01) | |
| B62D 21/15 | (2006.01) | |
| B62D 21/11 | (2006.01) | |

(52) U.S. Cl.
CPC ........... B62D 25/025 (2013.01); B62D 21/03 (2013.01); B62D 21/08 (2013.01); B62D 21/155 (2013.01); B62D 21/11 (2013.01)

(58) Field of Classification Search
CPC .. B62D 25/025; B62D 21/155; B62D 21/157; B62D 27/023
USPC ...................... 296/209, 187.09, 187.1, 29, 30
See application file for complete search history.

(56) References Cited

U.S. PATENT DOCUMENTS

| 8,070,215 B2 * | 12/2011 | Yoshioka ............. | B62D 25/025 |
| | | | 296/187.12 |
| 9,187,133 B2 * | 11/2015 | Rangaswamaiah .... | B62D 21/15 |
| 9,399,489 B2 * | 7/2016 | Iwama ................... | B60R 19/26 |
| 10,053,152 B2 * | 8/2018 | Kellner ................. | B62D 21/15 |
| 10,946,899 B2 * | 3/2021 | Hanaoka ............. | B62D 27/026 |
| 2010/0295336 A1 * | 11/2010 | Itakura .................. | B62D 25/04 |
| | | | 296/193.06 |
| 2014/0292031 A1 | 10/2014 | Nydam et al. | |

(Continued)

OTHER PUBLICATIONS

Aug. 21, 2019 European Search Report issued on International U.S. Appl. No. 19/168,666.

*Primary Examiner* — Dennis H Redder
(74) *Attorney, Agent, or Firm* — Clements Bernard Walker; Christopher L. Bernard (57) ABSTRACT

The disclosed subject matter generally relates to a lateral push element adapted to be arranged inside a hollow beam structure disposed on a lateral side of a vehicle. The lateral push element is configured to provide a lateral load path in the event of a partial overlap collision involving the vehicle. Some hollow beam structures on the lateral sides of the vehicle are often heavily deformed when the incoming barrier hit the hollow beam structures. The hollow beam structures are not in themselves able to transfer a lateral force. The space inside the hollow beam structures may thus be utilized for enabling additional lateral forces in the event of a partial overlap collision. The present disclosure provides a lateral push element adapted to be arranged inside the hollow beam structure disposed on a lateral side of a vehicle, and that is configured to provide a lateral load path in the event of a partial overlap collision involving the vehicle.

15 Claims, 5 Drawing Sheets

(56) References Cited

U.S. PATENT DOCUMENTS

| | | |
|---|---|---|
| 2015/0014084 A1 | 1/2015 | Iwama et al. |
| 2016/0185392 A1 | 6/2016 | Higuchi et al. |
| 2017/0050675 A1 | 2/2017 | Kellner et al. |
| 2017/0233007 A1 | 8/2017 | Park et al. |
| 2019/0023323 A1 | 1/2019 | Uehata |

* cited by examiner

LATERAL PUSH ELEMENT

CROSS-REFERENCE TO RELATED APPLICATION

The present disclosure claims the benefit of priority of co-pending European Patent Application No. 19168666.6, filed on Apr. 11, 2019, and entitled "LATERAL PUSH ELEMENT," the contents of which are incorporated in full by reference herein.

TECHNICAL FIELD

The present disclosure relates to a lateral push element configured to provide a lateral load path in the event of a partial overlap collision. The present disclosure also relates to a vehicle side structure comprising such a lateral push element.

BACKGROUND

Modern vehicles are typically equipped with advanced safety systems for reducing the risk of injury to occupants in the vehicle in the event of a collision. Such systems may be directly related to protecting the occupant, for example an air bag system arranged in the interior of the vehicle, or indirectly by a suitable structural design of the vehicle.

For example, the structure of the vehicle is often designed to absorb and distribute energy in a particular way in the event of a collision. For instance, most vehicles are equipped with bumpers that are configured to deform in the event of an impact. The bumper may be connected to crash boxes which are specifically designed to deform to absorb energy.

The vehicle structure may further be designed to behave differently depending on the type of collision. One type of collision that has received particular attention are so-called small overlap collisions. Contrary to a complete head on collision, in a small overlap collision the colliding vehicles are only partly overlapping. To better handle such small overlap collisions, the vehicle structure may be designed to create a lateral force to in this way push the opposing vehicle to the side, away from the vehicle interior compartment.

However, there is still room for improvement as there are several parts in the vehicle structure that to this day does not contribute to providing a lateral force in the event of a small overlap collision.

SUMMARY

The disclosed subject matter generally relates to a lateral push element adapted to be arranged inside a hollow beam structure disposed on a lateral side of a vehicle. The lateral push element is configured to provide a lateral load path in the event of a partial overlap collision involving the vehicle.

Some hollow beam structures on the lateral sides of the vehicle are often heavily deformed when the incoming barrier hit the hollow beam structures. The hollow beam structures are not in themselves able to transfer a lateral force. In other words, an opportunity to generate a lateral force is lost in prior art structures.

The inventors therefore realized that the space inside the hollow beam structures may be utilized for enabling additional lateral forces in the event of a partial overlap collision. Based on this insight, the inventors propose a lateral push element adapted to be arranged inside the hollow beam structure disposed on a lateral side of a vehicle, and that is configured to provide a lateral load path in the event of a partial overlap collision involving the vehicle.

In addition, to ensure a reliable function, the lateral push element is mechanically attachable inside the hollow beam structure to maintain its position inside the hollow beam structure.

Furthermore, for improved ability to transfer load in the lateral direction of the vehicle, the lateral push element may comprise reinforcing structures arranged in the plane of the lateral load path.

It should be understood that the lateral load path is in a side-to-side direction of the vehicle when the lateral push element is mounted. The lateral side-to-side direction is generally perpendicular to the driving direction of the vehicle.

In embodiments, the lateral push element has an inclined support side adapted to guide colliding components away from the vehicle, and to generate lateral force towards the vehicle.

Various beam structures may be equipped with the proposed lateral push element. However, one advantageous location is provided when the hollow beam structure comprises a rocker inner panel and a rocker outer panel, or a rocker beam. The rocker panel/beam is located below the doors of the vehicle.

The inventors also propose a vehicle side structure comprising a hollow beam structure disposed along a lateral side of the vehicle, and a lateral push element arranged and mechanically attached inside the hollow beam structure.

Further features of, and advantages with, embodiments of the present disclosure will become apparent when studying the appended claims and the following description. The skilled person realize that different features of the present invention may be combined to create embodiments other than those described in the following, without departing from the scope of the present invention.

BRIEF DESCRIPTION OF DRAWINGS

These and other aspects of the present invention will now be described in more detail, with reference to the appended drawings showing example embodiments of the invention, wherein.

DETAILED DESCRIPTION

In the present detailed description, various embodiments of a lateral push element according to the present invention are described. However, this invention may be embodied in many different forms and should not be construed as limited to the embodiments set forth herein; rather, these embodiments are provided for thoroughness and completeness, and to fully convey the scope of the invention to the skilled person. Like reference characters refer to like elements throughout.

Figure 1:
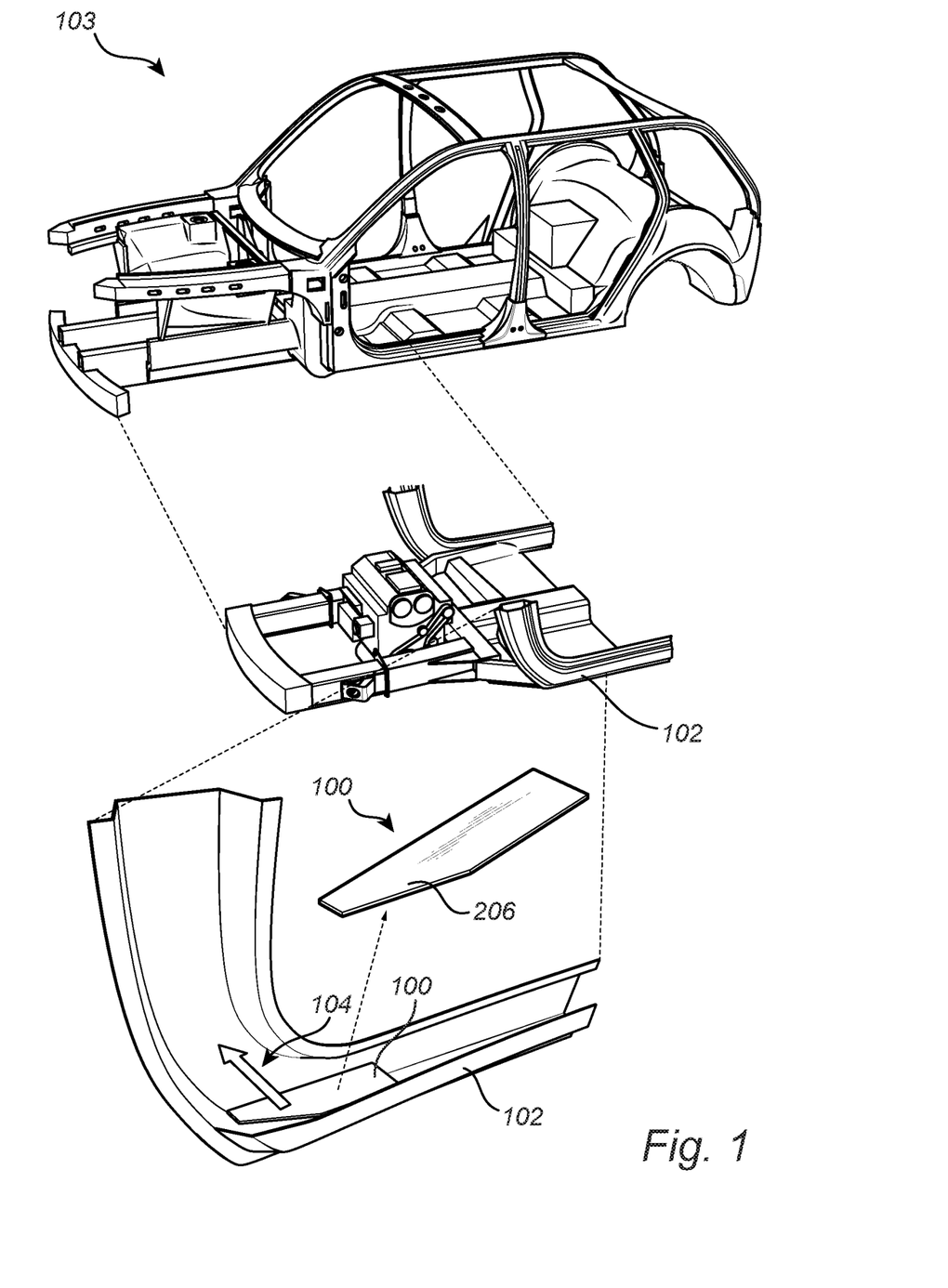
FIG. 1 illustrates an example lateral push element according to embodiments of the present disclosure arranged in a hollow beam structure of a vehicle.

FIG. 1 illustrates an example lateral push element according to embodiments of the present disclosure. The lateral push element 100 is adapted to be arranged inside a hollow beam structure 102 disposed on a lateral side of a vehicle body 103. The lateral push element 100 is configured to provide a lateral load path 104 in the event of a partial overlap collision involving the vehicle. Further, the lateral push element 100 is mechanically attachable inside the hollow beam structure 102 to maintain its position inside the hollow beam structure.

The inventor has realized that the space inside hollow beam structures disposed on the side of vehicles may be better used for improving the lateral force transfer in partial overlap collisions. Thus, instead of allowing the hollow beam structures to completely collapse by the collision force, the proposed lateral push element is mechanically attached inside the hollow beam structure to thereby provide a lateral load path into rigid structures of the vehicle such that the incoming barrier is better slid off the side of the vehicle.

Accordingly, the lateral push element equips the hollow beam structure with an internal structure which can transfer load in a lateral direction to thereby generate a side-push force and a slide off behavior of the incoming barrier. Thus, the lateral push element is adapted to be able to provide a side push effect on the incoming barrier.

The lateral load path 104 is in a lateral direction of the vehicle, i.e. from side-to-side of the vehicle. The lateral load path 104 is substantially perpendicular to the driving direction of the vehicle.

The hollow beam structure 102 may be either a beam formed in a single piece, or a beam structure formed by a set of panels. For example, the hollow beam structure may include an inner panel and an outer panel which are mounted together to form a hollow beam structure. The hollow beam structure is arranged on the lateral sides of the vehicle, where they are exposed to an incoming barrier in a partial overlap collision.

The lateral push element 100 is adapted to have a strong structural integrity in the plane of the load path 104 to thereby provide efficient load transfer in that plane. In other words, the lateral push element 100 is structurally strongest in the plane of the intended lateral load path 104. For example, according to some embodiments, the lateral push element is relatively planar, with lateral load path in the main plane on the lateral push element.

The lateral push element 100 may be wider and longer than its thickness. In other words, the lateral push element 100 may be plate-shaped, although the thickness should be enough to provide sufficient structural integrity to be able to withstand substantial deformation in the event of a partial overlap collision.

The lateral push element 100 may be mechanically attached inside the hollow beam structure by various means. For example, the lateral push element 100 may be e.g. welded to the inside of the hollow beam structure 102. In the cases where the hollow beam structure is made from an inner and an outer panel, the lateral push element 100 may be mechanically attached to one of the panels before the panels are mounted together. Example techniques for mechanically attaching the lateral push element inside the hollow beam structure include welding (such as e.g. spot welding), riveting, flow drilling, or any other mechanical attachment means known in the art for attaching metal components to each other. The attachment technique may depend on specific material choices and specific hollow beam structure designs.

The lateral push element is constructed to be able to withstand bending and twisting behavior. In order to better handle bending and twisting, the lateral push element may comprise reinforcing structures.

Figure 2:
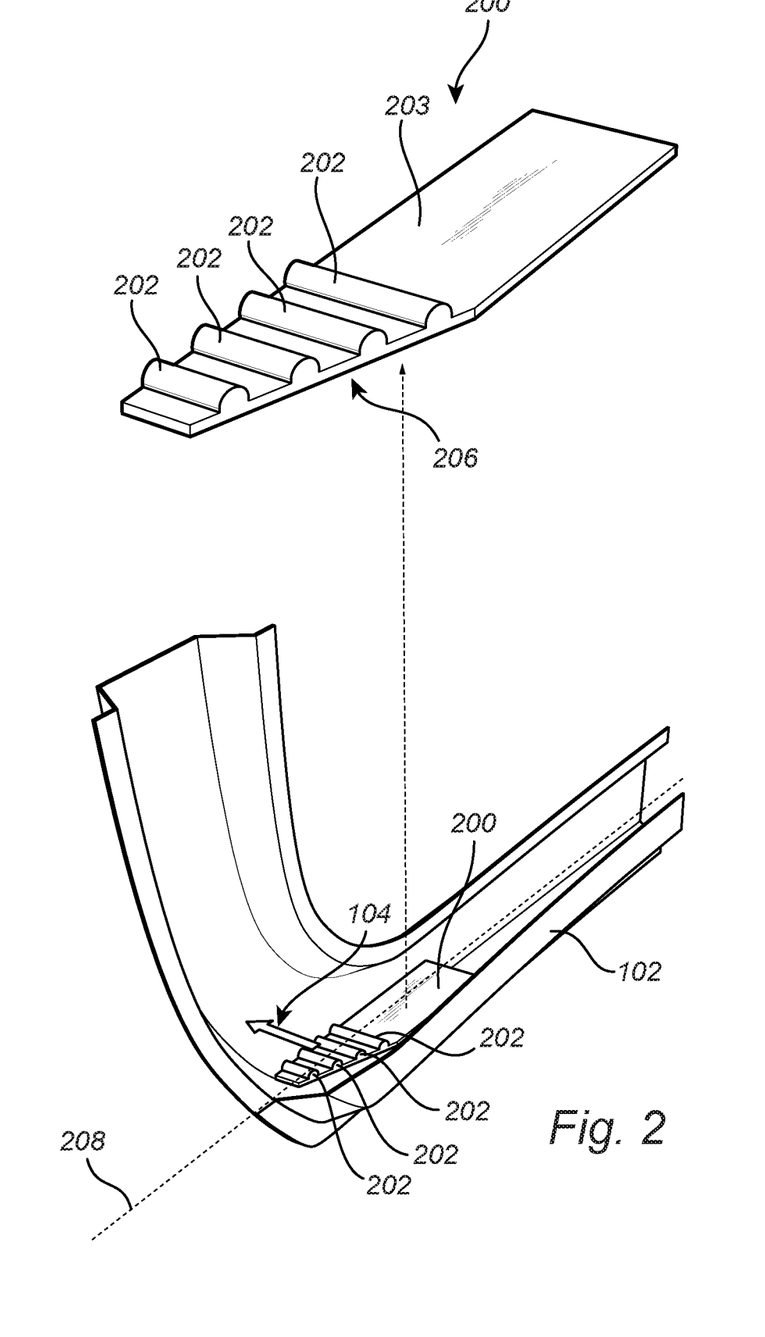
FIG. 2 illustrates an example lateral push element according to embodiments of the present disclosure arranged in a hollow beam structure.

FIG. 2 illustrates a lateral push element 200 which comprises reinforcing structures 202. More precisely, a main body 204 of the lateral push element 200 has thereon attached or formed longitudinal reinforcing structures 202 extending in the lateral load path 104. In the depicted embodiment, the longitudinal reinforcing structures extend along the entire upper surface 203 of the main body 204 of the lateral push element in the direction of the lateral load path 104. It is also possible to have the longitudinal reinforcing structures extend along the opposite surface, i.e. on the lower surface of the main body.

The longitudinal reinforcing structures 202 provide the advantage to increase the bending stiffness of the lateral push element and to provide an improved capability to transfer load into the vehicle body, in the lateral load path in the event of a collision. Thus, the reinforcing structures are configured to enhance the transmission of the load towards the vehicle body.

Furthermore, the shape, depth, length, and width of the longitudinal reinforcement structures may be different from the exemplified example embodiments shown in the drawings. The shape, depth, length, and width of the longitudinal reinforcement structures are tailored for a specific load case and hollow beam structure design. Although the depicted longitudinal reinforcement structures are here shown as straight segments, they may generally comprise curved segments or several straight interconnected segments. However, the overall directions of the longitudinal reinforcement structures are along the respective lateral direction, in the load path direction.

The longitudinal reinforcing structures may be provided in various ways. In addition to the herein shown cylindric rods with semi-circular cross-sections which are made in one piece with the lateral push element, the longitudinal reinforcing structures may be provided by e.g. a recess or a circular rod or a rod having any other cross-section suitable, attached to the main body or by any other solid or hollow structures which may provide improved bending and twisting stiffness. The longitudinal rods provide one advantageous way to realize the longitudinal reinforcing structures.

In the embodiments illustrated in FIGS. 1 and 2, the lateral push element 100, 200 includes an inclined support side 206 adapted to guide colliding components away from the vehicle body, and to generate lateral force towards the vehicle body.

The inclined support side 206 is angled with respect to an axis 208 parallel with the longitudinal axis of the vehicle, e.g. parallel to a forward driving direction of the vehicle, when the lateral push element 100, 200 is mounted in the hollow beam structure 108.

In the event of a partial overlap collision, the inclined support side will advantageously assist in sliding the incoming barrier away from the vehicle body. Thus, as the barrier reaches the lateral push element, it transfers force from the impact with the barrier in the direction of the lateral load path from the inclined support surface.

The longitudinal reinforcing structures extend from the inclined support surface 206 and towards the vehicle body, when the lateral push element is mounted in the hollow beam structure. The structural integrity and thus ability to transfer load is improved if the longitudinal reinforcing structures are adapted to stretch along the entire width of the lateral push element. The width of the lateral push element 200 is along the direction of the lateral load path 104, when the lateral push element is mounted in the hollow beam structure 102.

FIG. 3A-D conceptually describe the crash dynamics when a barrier 300 collides with a vehicle 302 in a small partial overlap collision and that eventually results in the barrier reaching the hollow beam structures in which a lateral push element according to the present disclosure may be arranged.

Figure 3A:
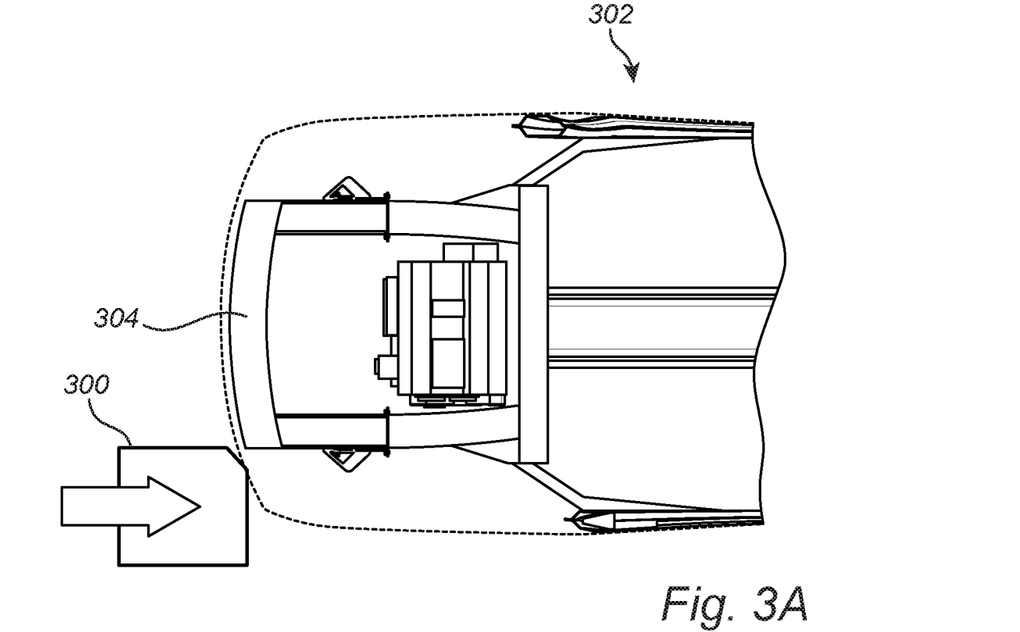
FIG. 3A-D conceptually describe the crash dynamics when a barrier collides with a vehicle in a small partial overlap collision.

In the initial position illustrated in FIG. 3A, the barrier 300 hits the bumper 304 of the vehicle front structure. The bumper usually has an ability to absorb some energy from the impact, and in the case of small partial overlap collision to provide a slight side push on the barrier.

Figure 3B:
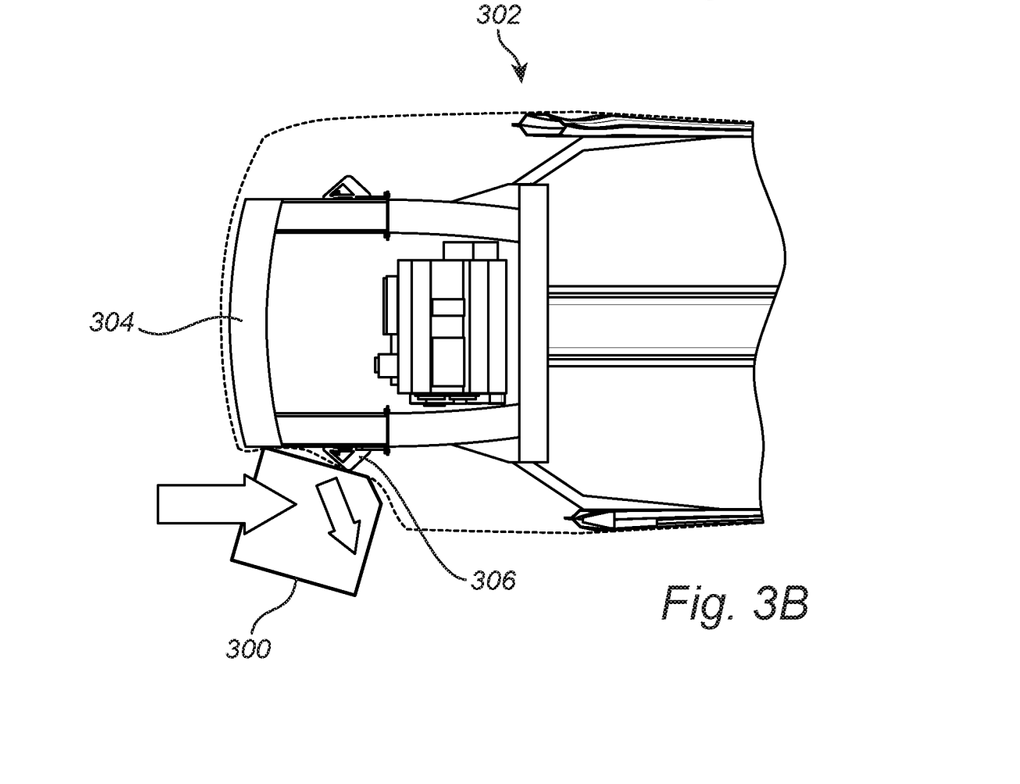

In the second position illustrated in FIG. 3B, some side push on the barrier 300 has been caused by the front structures of the vehicle. Such front structures may relate to e.g. Shotgun or Amazon design, as is well known to the skilled person. In some vehicle front structures, a push member 306 provides further side push away from the vehicle in a lateral direction, and a crash box 307 absorbs some energy.

Figure 3C:
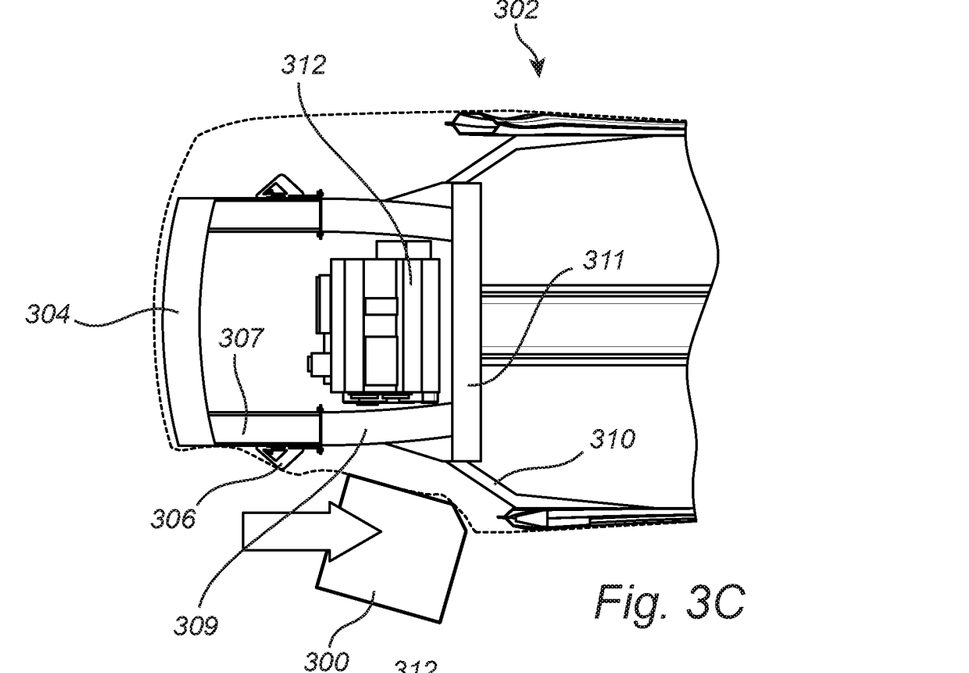
Figure 3D:
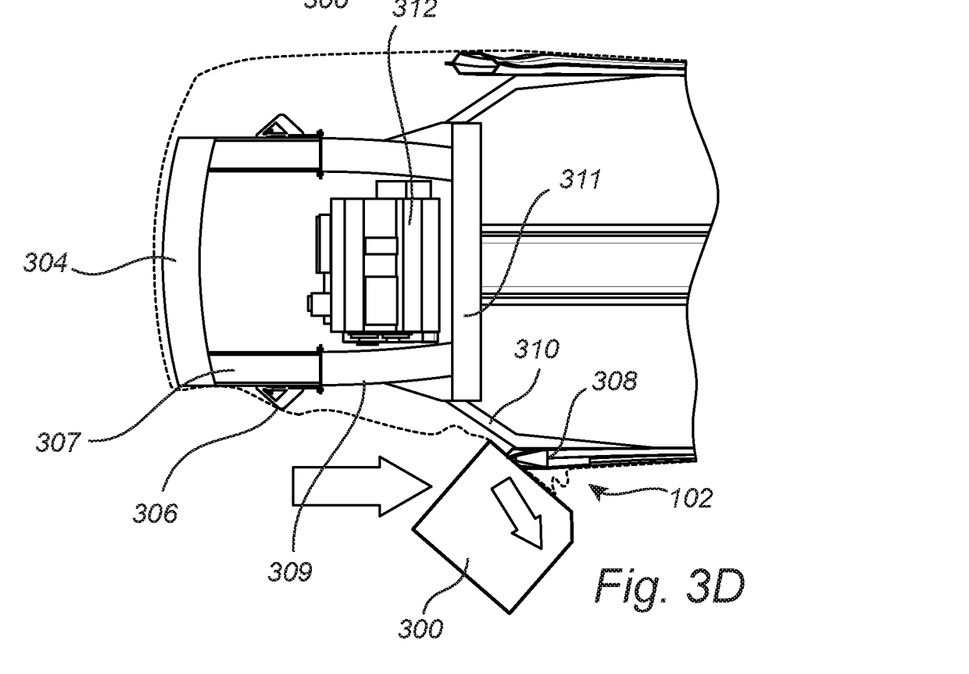

As the barrier 300 penetrates further into the vehicle structure as illustrated in FIG. 3C, it is often further pushed to the side by internal vehicle structures formed by side beams 309, 310, and subframe parts 311, and in some cases the engine 312, that will not be described in detail herein. Eventually, when the barrier 300 penetrates even further into the vehicle structure, the barrier reaches the hollow beam structures 102 that are disposed on the lateral side of the vehicle, as shown in FIG. 3D. A lateral push element 308 according to the present disclosure is mechanically attached inside the hollow beam structures 102.

In prior art vehicle side structures, where the hollow beam structure does not have a lateral push element attached therein, the hollow beam structure is usually heavily deformed. This means that no lateral push is provided once the barrier reaches the hollow beam structure and an opportunity to provide a lateral push is missed.

However, with the lateral push element proposed in the present disclosure attached inside the hollow beam, a further lateral push is generated as the barrier hits the hollow beam structure 102 at the location of the lateral push element. Since the lateral push element is adapted to have a strong structural integrity in the lateral direction, a lateral load path is provided into the rigid parts of the vehicle such as the side beam 310 or the sub frame parts 311. This further provides for pushing the barrier 300 away from the vehicle 302 such that a slide-off of the barrier is obtained, as is conceptually illustrated in FIG. 3D.

Figure 4A:
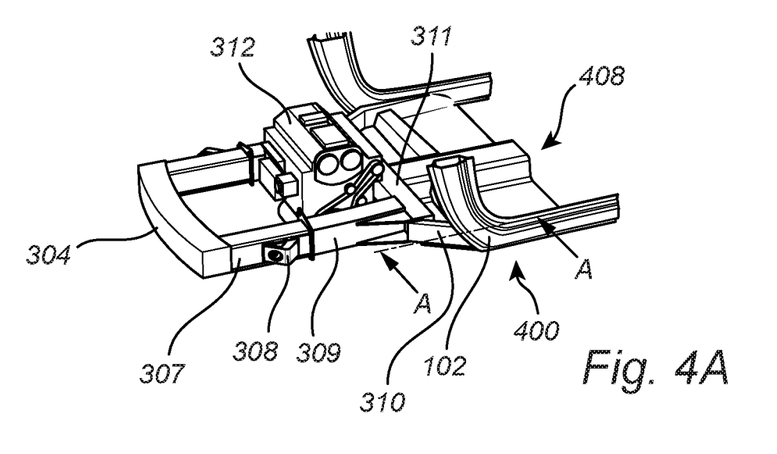
FIG. 4A conceptually illustrates an example vehicle side structure of a vehicle front structure, where a lateral push element may be arranged.

FIG. 4A illustrates an example vehicle side structure 400 generally arranged rearwards of a vehicle front structure including a bumper 304 side beams 309, 310, and subframe parts 311, here also including the engine 312, according to embodiments of the present disclosure. The vehicle side structure 400 comprises a hollow beam structure 102 disposed along a lateral side of the vehicle, rearwards of the vehicle front structure. Furthermore, a lateral push element 404 is mechanically attached inside the hollow beam structure, as will be further described with reference to FIG. 4B. The lateral push element is thus arranged in a hollow beam structure 102 located rearward of the vehicle front structures which absorb some of the initial load in a small partial overlap collision. The lateral push element is thus arrangeable in a location where vehicle structures has already caused some side push when the barrier reaches the lateral push element, as was described with reference to FIG. 3A-D.

Figure 4B:
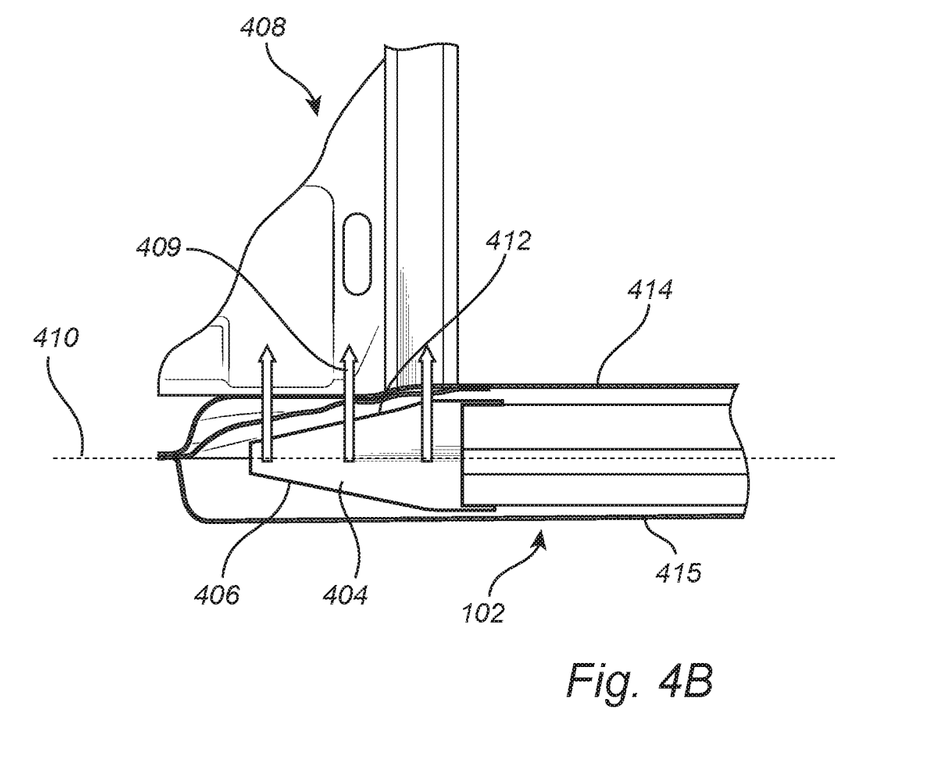
FIG. 4B illustrates an example lateral push element according to embodiments of the present disclosure arranged in a hollow beam structure.

The lateral push element 404 has an inclined support side 406 adapted to guide colliding components away from the vehicle body 408, and to generate lateral force, indicated by arrows 409, towards the vehicle body 408. When the lateral push element 404 is arranged in the hollow beam structure, the inclined support side 406 is inclined with respect to the longitudinal axis 410 along the hollow beam 102 and generally also along the vehicle longitudinal axis.

In this example the lateral push element has a tapered shape. The tapered shape provides for an inclined outer support side 406 with advantages discussed above, and for an inclined inner side 412 which facilitates packaging inside some hollow beam structures where the space may be restricted.

The lateral push element according to embodiments of the present disclosure is advantageously produced by casting. In order to provide strong structural integrity on the lateral load path direction to thereby by improve the ability to transfer load in the later direction, the casting direction when producing the lateral push element is in the lateral direction of the vehicle once mounted in the hollow beam structure.

The reinforcing structures may advantageously be casted in one piece with the lateral push element, i.e. in the same casting process. This provides improved structural strength of the lateral push element and improved performance of the reinforcing structures compared to mounting them on the lateral push element after the casting process.

The hollow beam structure may be a so-called rocker panel or a rocker beam, arranged below a vehicle door. The hollow beam structure may in some possible implementations include a rocker inner panel 414 and a rocker outer panel 415.

The proposed lateral push element according to herein described embodiment may preferably be made from lightweight metal such as e.g. aluminum or aluminum alloys and produced by means of casting.

The person skilled in the art realizes that the present invention by no means is limited to the preferred embodiments described above. On the contrary, many modifications and variations are possible within the scope of the appended claims.

Furthermore, the illustrated locations of longitudinal reinforcing structures are herein shown to exemplify the invention and the specific configuration may be adjusted depending on the specific case.

In addition, although the number of longitudinal reinforcing structures are herein illustrated as being four, this merely serves as an example and many difference configurations are possible and within the scope of the appended claims.

For example the lateral push element may be manufactured by extrusion although the preferred technique is casting.

In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measured cannot be used to advantage. Any reference signs in the claims should not be construed as limiting the scope.

Various examples have been described. These and other examples are within the scope of the following claims.

The invention claimed is:

1. A lateral push element adapted to be arranged inside a hollow beam structure disposed on a lateral side of a vehicle, wherein the lateral push element is configured to provide a lateral load path in the event of a partial overlap collision involving the vehicle, and wherein the lateral push element is mechanically attachable inside the hollow beam structure to maintain its position inside the hollow beam structure, wherein the lateral push element is substantially plate-shaped with the lateral load path in a main flat plane of the plate-shaped lateral push element.

2. The lateral push element according to claim 1, wherein the lateral push element comprises reinforcing structures arranged adjacent the plane of the lateral load path.

3. The lateral push element according to claim 2, wherein the reinforcing structures are made in one piece with the lateral push element.

4. The lateral push element according to claim 2, wherein the reinforcing structures are included in a main body of the lateral push element.

5. The lateral push element according to claim 1, wherein the lateral push element is relatively planar.

6. The lateral push element according to claim 1, wherein the lateral push element has an inclined support side adapted to guide colliding components away from the vehicle body, and to generate lateral force towards the vehicle body.

7. The lateral push element according to claim 1, wherein the lateral push element has a tapered shape.

8. The lateral push element according to claim 1, produced by casting.

9. The lateral push element according to claim 8, wherein the casting direction when producing the lateral push element is in the lateral direction of the vehicle once mounted in the hollow beam structure.

10. A vehicle side structure comprising:
a hollow beam structure disposed along a lateral side of a vehicle; and
a lateral push element arranged and mechanically attached inside the hollow beam structure, wherein the lateral push element is configured to provide a lateral load path in the event of a partial overlap collision involving the vehicle, and wherein the lateral push element is mechanically attached inside the hollow beam structure to maintain its position inside the hollow beam structure, wherein the lateral push element is substantially plate-shaped with the lateral load path in a main flat plane of the plate-shaped lateral push element.

11. The vehicle side structure according to claim 10, wherein the lateral push element is attached in the hollow beam structures adjacent a rigid lateral structure of the vehicle, to thereby transfer lateral force to the opposite side of the vehicle via the rigid lateral structure.

12. The vehicle side structure according to claim 10, wherein the lateral push element comprises an inclined support side arranged at an angle with respect to a longitudinal axis of the vehicle.

13. The vehicle side structure according to claim 10, wherein the lateral push element has a tapered shape, wherein the narrower portion of the tapered shape points in a driving forward direction of the vehicle.

14. The vehicle side structure according to claim 10, wherein the hollow beam comprises a rocker inner panel and a rocker outer panel, or a rocker beam.

15. A vehicle comprising:
a vehicle side structure comprising:
a hollow beam structure disposed along a lateral side of the vehicle; and
a lateral push element arranged and mechanically attached inside the hollow beam structure, wherein the lateral push element is configured to provide a lateral load path in the event of a partial overlap collision involving the vehicle, and wherein the lateral push element is mechanically attached inside the hollow beam structure to maintain its position inside the hollow beam structure, wherein the lateral push element is substantially plate-shaped with the lateral load path in a main flat plane of the plate-shaped lateral push element.

* * * * *